(12) United States Patent
Yabe

(10) Patent No.: US 12,305,737 B2
(45) Date of Patent: May 20, 2025

(54) BALL SCREW

(71) Applicant: NSK LTD., Tokyo (JP)

(72) Inventor: Takayuki Yabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/284,986

(22) PCT Filed: Mar. 25, 2022

(86) PCT No.: PCT/JP2022/014700
§ 371 (c)(1),
(2) Date: Sep. 29, 2023

(87) PCT Pub. No.: WO2022/210432
PCT Pub. Date: Oct. 6, 2022

(65) Prior Publication Data
US 2024/0183434 A1 Jun. 6, 2024

(30) Foreign Application Priority Data
Mar. 31, 2021 (JP) .................. 2021-062356

(51) Int. Cl.
F16H 25/22 (2006.01)
(52) U.S. Cl.
CPC ................ F16H 25/2214 (2013.01)
(58) Field of Classification Search
CPC .................................. F16H 25/2214
See application file for complete search history.

(56) References Cited

U.S. PATENT DOCUMENTS

| 5,303,607 A * | 4/1994 | Katahira ............. F16H 25/2214 |
| | | 74/424.87 |
| 2005/0016308 A1* | 1/2005 | Hayashi ............. F16H 25/2214 |
| | | 74/424.86 |
| 2015/0151780 A1 | 6/2015 | Fujita et al. |

FOREIGN PATENT DOCUMENTS

| JP | 2004-340220 A | 12/2004 |
| JP | 2008-151244 A | 7/2008 |

(Continued)

OTHER PUBLICATIONS

International Search Report (PCT/ISA/210) dated Apr. 26, 2022, issued by the International Searching Authority in counterpart International Application No. PCT/JP2022/014700.

(Continued)

Primary Examiner — Terence Boes
(74) Attorney, Agent, or Firm — Sughrue Mion, PLLC

(57) ABSTRACT

A nut of a ball screw is formed with, in a notch portion, an elongated hole that penetrates in a radial direction, and whose longitudinal direction is formed along a lead angle and parts of both longitudinal side surfaces parallel to each other guide balls. A circulation part includes: a first circulation component that is disposed in the notch portion so as to abut against a bottom wall surface of the notch portion and has a tongue portion accommodated in the elongated hole; a second circulation component that is disposed in the notch portion so as to cover the first circulation component and accommodated in the elongated hole, and has a wall portion facing the tongue portion; and a higher strength pipe that is disposed in an abutting surface where the first and second circulation components abut against each other, constitutes a part of a ball circulation path.

2 Claims, 5 Drawing Sheets

(56) References Cited

FOREIGN PATENT DOCUMENTS

| | | |
|---|---|---|
| JP | 2010-164152 A | 7/2010 |
| JP | 2015-105710 A | 6/2015 |

OTHER PUBLICATIONS

Written Opinion (PCT/ISA/237) dated Apr. 26, 2022, issued by the International Searching Authority in counterpart International Application No. PCT/JP2022/014700.

* cited by examiner

BALL SCREW

CROSS-REFERENCE TO RELATED APPLICATIONS

This application is a National Phase Entry of PCT International Application No. PCT/JP2022/014700 filed on Mar. 25, 2022, which claims priority to Japanese Patent Application No. 2021-062356 filed on Mar. 31, 2021, the contents of all of which are incorporated herein by reference in their entirety.

TECHNICAL FIELD

The present invention relates to a ball screw.

BACKGROUND ART

As a ball screw device of this type of the related art, for example, a ball screw device shown in FIG. 7 is known.

In a ball screw device 110, a nut 114 having a spiral screw groove 113 corresponding to a spiral screw groove 11 on an inner peripheral surface is screwed to a screw shaft 112 having the spiral screw groove 111 on an outer peripheral surface and extending in an axial direction. The screw groove 111 of the screw shaft 112 and the screw groove 113 of the nut 114 face each other to form a load raceway therebetween, and a large number of balls 115 as a rolling body are rollably loaded in the load raceway.

A ball return passage 116 penetrating in the axial direction is formed in a wall portion of the nut 114, and notches 117 through which end portions of the ball return passage 116 open are formed in both end portions of the nut 114 (see FIG. 7). A circulation piece (circulation part) 130 for communicating the ball return passage 116 with the load raceway between the screw grooves 111, 113 is fixedly fitted into each of the notches 117.

As shown in FIG. 8, the circulation piece 130 is formed with a curved ball circulation groove 120 that communicates between the ball return passage 116 and the load raceway between the two screw grooves 111, 113, and a tongue portion 119 that scoops up the balls 115 which roll on the load raceway between the two screw grooves 111, 113 is provided at a front end of the ball circulation groove 120. A circulation passage 121 for the balls 115 is formed by each of the ball circulation grooves 120 and a ball running surface wider than a diameter of the ball provided on an inner surface of the corresponding notch 117 in a radial direction, and an endless circulation passage for the balls 115 is formed by the ball circulation passages 121, the load raceway between the two screw grooves 111, 113, and the ball return passage 116. Further, as the screw shaft 112 (or the nut 114) rotates, the nut 114 (or the screw shaft 112) moves in the axial direction via the rolling of the balls 115.

In the ball screw described in Patent Literature 1, a portion of the ball circulation groove 120 of the circulation piece 130 is formed by a ball circulation groove forming member (high-strength material) 131 made of metal having a higher strength than a strength of a synthetic resin molded body. The ball circulation groove forming member 131 is formed by, for example, press molding of a sheet metal or the like, and is integrally molded with the circulation piece 130. In addition, in Patent Literature 1, the inner surface of the notch 117 in the radial direction is formed to be deeper, and a plate for preventing separation such as a super hard alloy plate is mounted, and a plate surface is used as the ball running surface of the notch 117. Accordingly, when the circulating balls collide with an inner surface of a direction changing portion, the balls are prevented from being peeled off to have a bad influence on operability due to a circulation failure of the balls.

CITATION LIST

Patent Literature

Patent Literature 1: JP2004-340220A

SUMMARY OF INVENTION

Technical Problem

However, since a circulation component described in Patent Literature 1 is manufactured by insert molding, a structure in which two components are physically connected to each other is necessary, and the design becomes complicated. Further, there is a problem that a shape of the circulation component described in Patent Literature 1 cannot be applied to a circulation component having a small groove width of a small lead.

The present invention has been made in view of the problems described above, and an object of the present invention is to provide a ball screw that can ensure a more stable operation by improving a strength of a ball circulation part and can be applied to a small lead or a large lead of multi-thread specification having a small ball pitch.

Solution to Problem

The above object of the present invention is achieved by the following configuration.

(1) A ball screw including:
 a screw shaft formed with a spiral screw groove on an outer peripheral surface thereof;
 a nut formed with a spiral screw groove on an inner peripheral surface thereof and provided with a notch portion on an outer peripheral surface thereof;
 balls configured to roll between the screw groove of the screw shaft and the screw groove of the nut; and
 a circulation part forming a ball circulation path for circulating the balls rolling between both screw grooves of the screw shaft and the nut and attached to the notch portion, in which
 the nut is formed with, in the notch portion, an elongated hole that penetrates in a radial direction, and whose longitudinal direction is formed along a lead angle and parts of both longitudinal side surfaces parallel to each other guide the balls, and
 the circulation part includes
  a first circulation component that is disposed in the notch portion so as to abut against a bottom wall surface of the notch portion and has a tongue portion accommodated in the elongated hole,
  a second circulation component that is disposed in the notch portion so as to cover the first circulation component and accommodated in the elongated hole, and has a wall portion facing the tongue portion, and
  a pipe that is disposed in an abutting surface where the first circulation component and the second circulation component abut against each other, constitutes a part of the ball circulation path, and has a higher strength than materials of the first and second circulation components.

(2) The ball screw according to (1), in which
 a scoop-up part of the ball circulation path is constituted by the tongue portion of the first circulation component, the wall portion of the second circulation component, and the both longitudinal side surfaces of the elongated hole, and
 a direction changing part of the ball circulation path is constituted by the pipe.

Advantageous Effects of Invention

In the ball screw according to the present invention, there is provided the ball screw that can ensure a more stable operation by improving a strength of a ball circulation part and can be applied to a small lead or a large lead of multi-thread specification having a small ball pitch.

DESCRIPTION OF EMBODIMENTS

Figure 7:
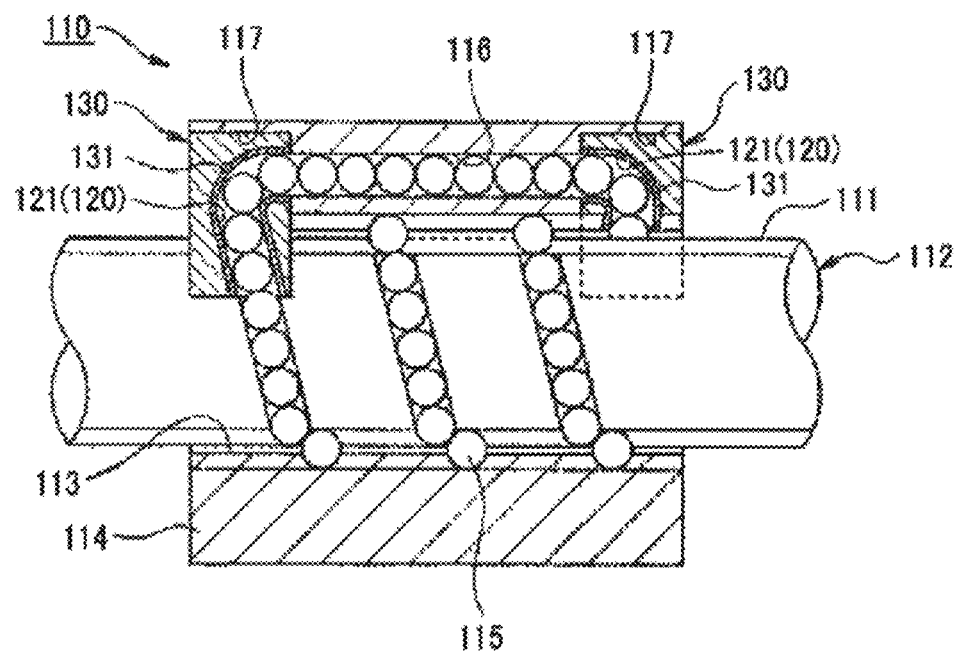
FIG. 7 is a sectional view of main parts of a ball screw of the related art.
Figure 8:
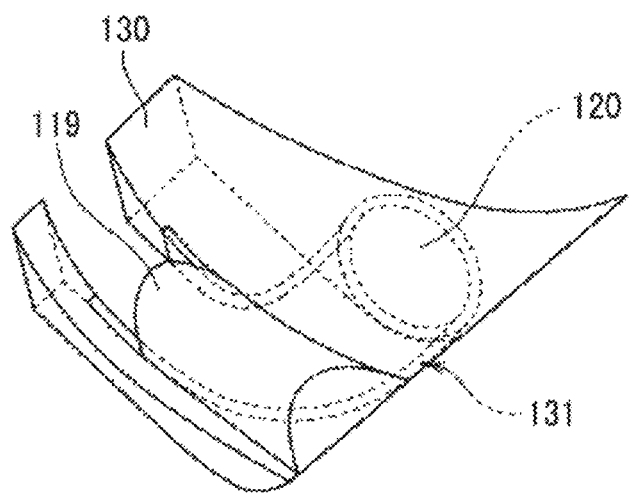
FIG. 8 is an overall perspective view showing an example of a circulation piece used in the ball screw of FIG. 7.

Hereinafter, a ball screw according to an embodiment of the present invention will be described in detail with reference to the drawings. The ball screw according to the present invention is characterized by a nut and a circulation part, and a screw shaft 112 and balls 115 of the related art shown in FIG. 7 are referred to for a screw shaft and balls that are constituent elements.

Figure 1A:
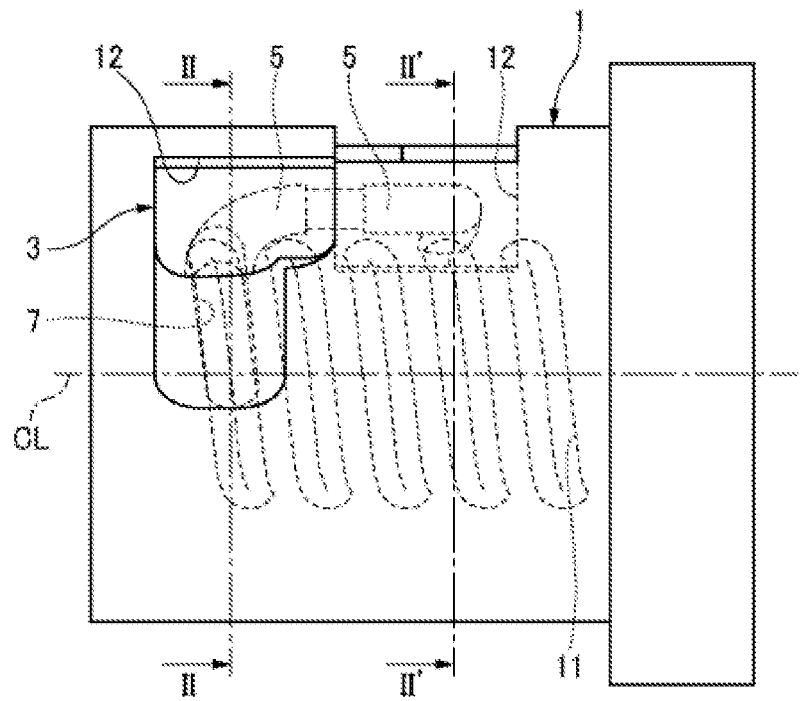
FIG. 1A is a side view showing a nut of a ball screw according to an embodiment of the present invention.

As shown in FIG. 1A, a nut 1 made of metal is formed in a cylindrical shape, and
 one spiral screw groove 11 is formed on an inner peripheral surface thereof.

In addition, an outer peripheral surface of the nut 1 is formed with two notch portions 12 cut out from an outer side in a radial direction. Further, an elongated hole 7, which penetrates in the radial direction and opens corresponding to the screw groove 11 formed in the inner peripheral surface, is formed in each of the notch portions 12.

First and second circulation components 2, 3 and a pipe 5, which serve as a circulation part, are attached to the notch portion 12, which forms a ball circulation path for circulating the balls 115 rolling between the screw grooves 111, 11 of the screw shaft 112 and the nut 1.

Figure 1B:
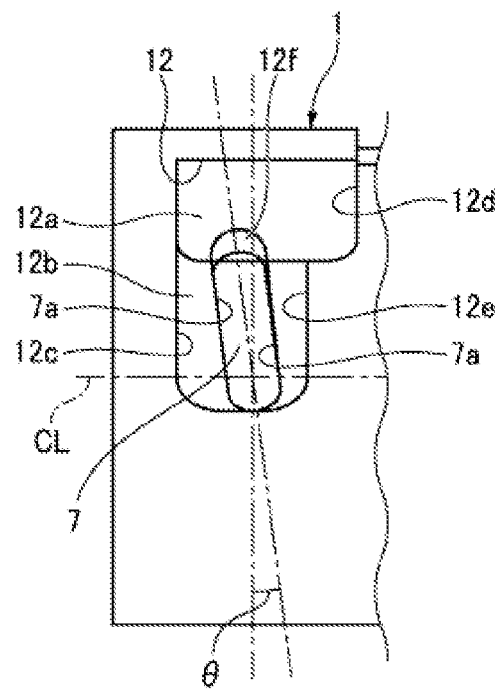
FIG. 1B is a partial side view showing a notch portion of the nut from which a circulation component is removed.
Figure 2A:
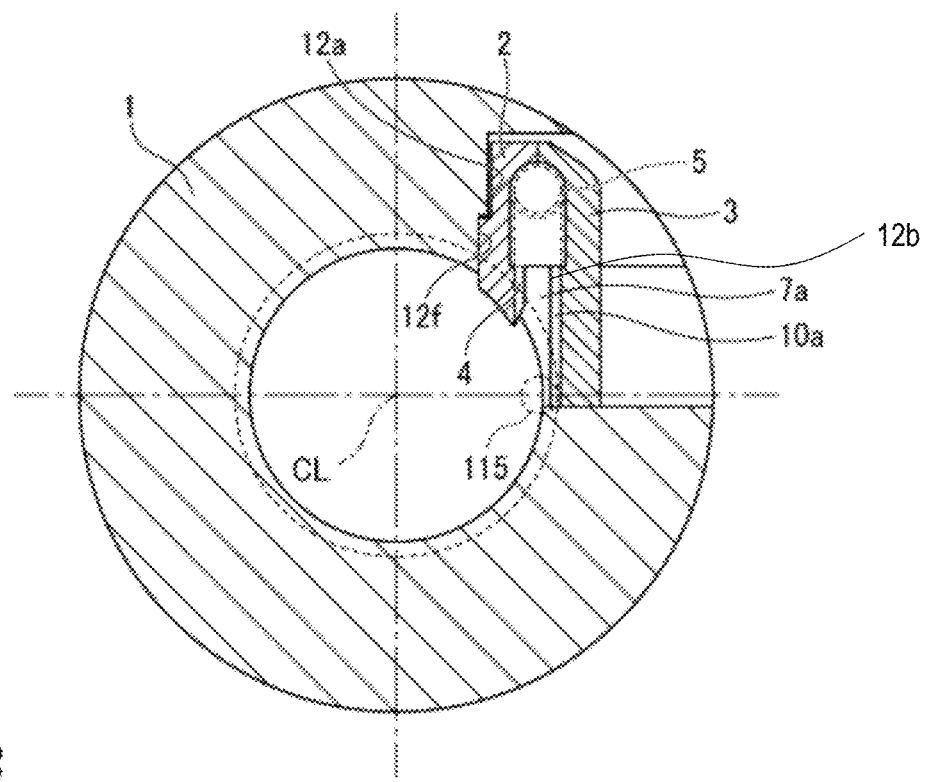
FIG. 2A is a cross-sectional view taken along a line II-II of FIG. 1A.
Figure 2B:
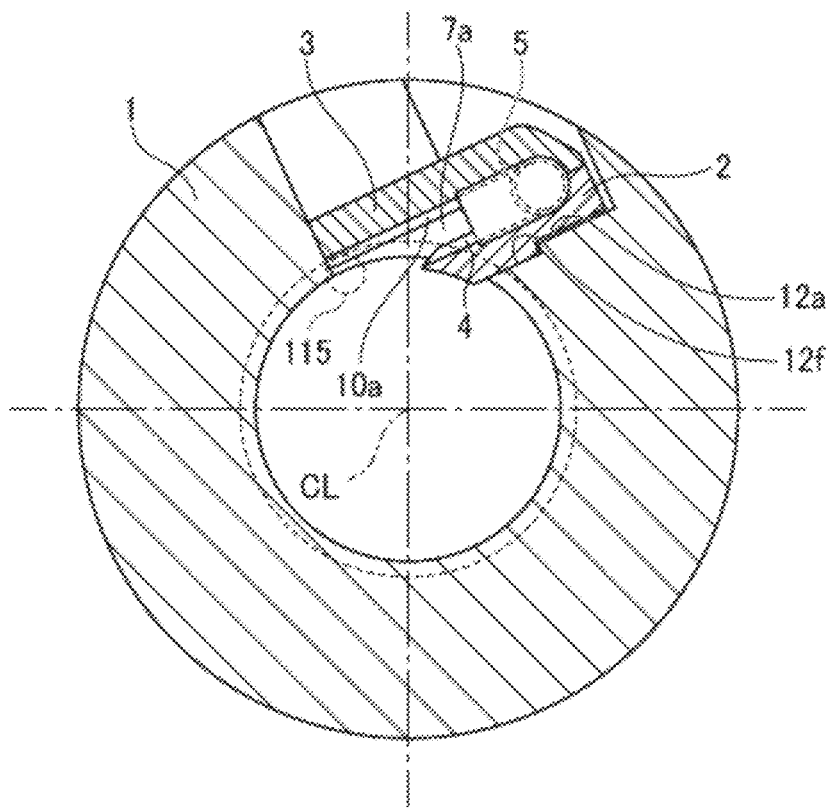
FIG. 2B is a cross-sectional view taken along a line II'-II' of FIG. 1A.

As shown in FIG. 1B, in the notch portion 12, two bottom wall surfaces 12a, 12b parallel to a center axis of the nut 1 and parallel to each other are formed in a stepped shape, and inner wall surfaces 12c, 12d, and 12e are formed along the radial direction on both axial sides of the two bottom wall surfaces 12a, 12b. The bottom wall surface 12a is formed longer on one side in the axial direction than the bottom wall surface 12b. A counterbore portion 12f is formed in a part of the bottom wall surface 12a adjacent to the elongated hole 7 in a longitudinal direction.

The elongated hole 7 is formed along a lead angle θ of the screw groove 11 in the longitudinal direction and has the same width as the screw groove 11. The elongated hole 7 is used such that a part of both longitudinal side surfaces 7a parallel to each other guides the balls 115 when the circulation part is attached to the inside of the notch portion 12 to form a scoop-up part for scooping up the balls 115 in the elongated hole 7.

The circulation part constitutes, in the ball circulation path, a direction changing part that changes a movement direction of the scooped-up balls 115 so as to be directed in the axial direction from a direction of the scoop-up part along the lead angle θ to the other circulation part, in addition to the scoop-up part described above.

Figure 3A:
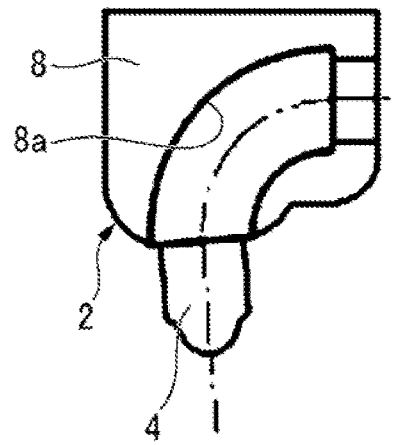
FIG. 3A is a front view of a first circulation component.
Figure 3B:
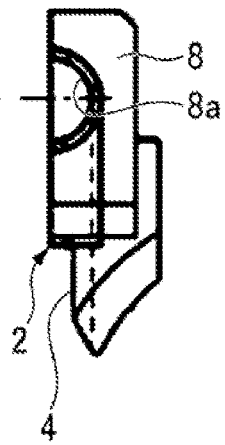
FIG. 3B is a side view thereof.
Figure 3C:
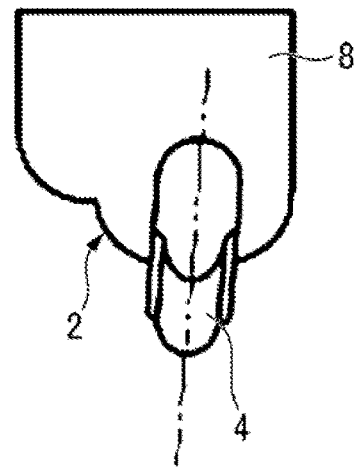
FIG. 3C is a back view thereof.

Specifically, as shown in FIGS. 3A to 3C, the first circulation component 2 includes a main body portion 8 forming a semi-columnar pipe accommodating groove 8a for accommodating one portion (half portion) of the pipe 5, and a tongue portion 4 accommodated in the elongated hole 7.

Figure 4A:
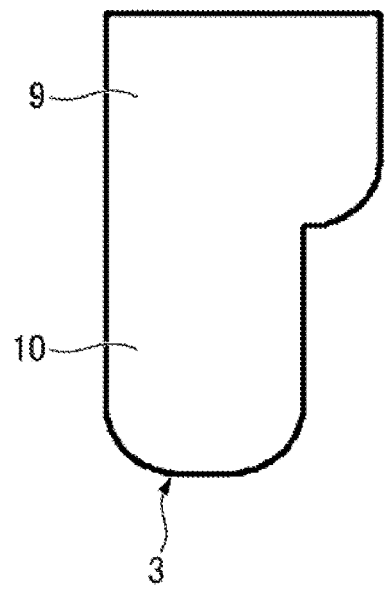
FIG. 4A is a front view of a second circulation component.
Figure 4B:
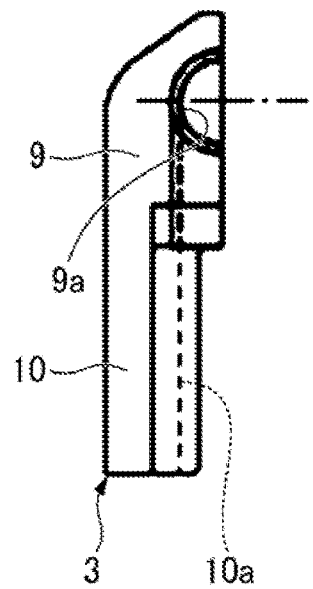
FIG. 4B is a side view thereof.
Figure 4C:
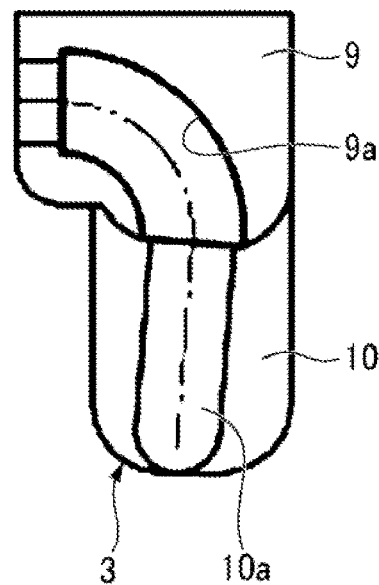
FIG. 4C is a back view thereof.

As shown in FIGS. 4A to 4C, the second circulation component 3 includes a main body portion 9 in which a semi-columnar pipe accommodating groove 9a for accommodating a remaining portion (half portion) of the pipe 5 is formed on a back surface of the main body portion 9 that abuts against a front surface of the first circulation component 2, and an extending portion 10 that is formed so as to be continuous with a front surface of the main body portion 9 and has a wall portion 10a constituting the scoop-up part on a back surface thereof. In the main body portion 9, an abutting surface that abuts against the main body portion 8 of the first circulation component 2 has substantially the same size as the front surface of the main body portion, and the back surface of the extending portion 10 other than the wall portion 10a abuts against the bottom wall surface 12b of the notch portion 12.

Figure 5A:
FIG. 5A is a front view of a pipe.
Figure 5B:
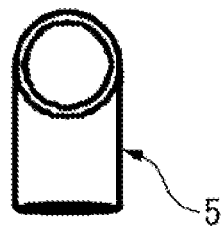
FIG. 5B is a side view thereof.

As shown in FIGS. 5A and 5B, the pipe 5 is a curved cylindrical member forming a direction changing path of the ball circulation path, and is disposed in both pipe accommodating grooves 8a, 9a of the abutting surface where the first circulation component 2 and the second circulation component 3 abut. The pipe 5 is made of, for example, metal, which is a material having higher strength than materials (resin in the present embodiment) of the first and second circulation components 2, 3.

Although the pipe 5 is formed in an arc shape having a single curvature, at least one end portion of the pipe 5 may be provided with a straight portion, and the pipe 5 may be exposed on both end surfaces of the circulation part.

Figure 6A:
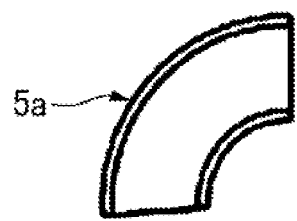
FIG. 6A is a front view of a pipe according to a modification.
Figure 6B:
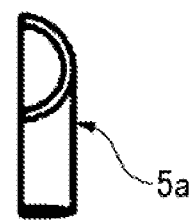
FIG. 6B is a side view thereof.

The pipe 5 may be formed by combining a pair of pipe pieces 5a divided into two as shown in FIGS. 6A and 6B. Such a pipe piece 5a may be manufactured by press working or the like.

The first circulation component 2 is disposed in the notch portion 12 so as to abut against the bottom wall surface 12a of the notch portion 12, and the tongue portion 4 is disposed in the elongated hole 7. In addition, the second circulation component 3 is disposed in the notch portion 12 so as to cover the first circulation component 2. At this time, the wall portion 10a of the second circulation component 3 is accommodated in the elongated hole 7 and faces the tongue portion 4.

Accordingly, the scoop-up part of the ball circulation path is constituted by the tongue portion 4 of the first circulation component 2, the wall portion 10a of the second circulation component 3, and the both longitudinal side surfaces 7a of the elongated hole 7.

The first circulation component 2, the pipe 5, and the second circulation component 3 may be assembled into the notch portion 12 in this order, or may be assembled into the notch portion 12 in an assembled state.

According to the ball screw of the present embodiment, since the pipe 5 is used in the direction changing part, it is possible to ensure a more stable operation by improving the strength of the ball circulation part, and since the both longitudinal side surfaces 7a of the elongated hole 7 formed in the nut 1 are used in the scoop-up part, it is also possible to apply the ball screw to a small lead or a large lead of multi-thread specification having a small ball pitch.

The present invention is not limited to the embodiment and the modifications described above, and modifications, improvements, and the like can be appropriately made.

In the present embodiment, the ball circulation path is configured by communicating parts of the two notch portions 12 and directly connecting the two circulation parts attached to the respective notch portions 12, but a ball return passage extending in the axial direction may be formed in the nut 1 between the two circulation parts in accordance with an axial length of the nut 1 as in FIG. 7, for example.

The ball screw according to the present invention is used, for example, in an XY stage used for positioning of a device that performs high-precision processing and measurement, manufacturing of a semiconductor, or the like. In addition, the ball screw is used in, for example, a machine tool (a machining center, a lathe, a grinder, or the like), a measuring machine (a three-dimensional measuring instrument), a semiconductor manufacturing device (a table of an exposure device, an inspection probe, or the like), or the like.

The present application is based on a Japanese patent application (Japanese Patent Application No. 2021-062356) filed on Mar. 31, 2021, and the contents thereof are incorporated herein by reference.

REFERENCE SIGN LIST 1 nut
2 first circulation component
3 second circulation component
4 tongue portion
5 pipe
7 elongated hole
8, 9 main body portion
10a wall portion
11 screw groove
12 notch portion
111 screw groove
112 screw shaft
115 ball

The invention claimed is:

1. A ball screw comprising:
a screw shaft formed with a spiral screw groove on an outer peripheral surface thereof;
a nut formed with a spiral screw groove on an inner peripheral surface thereof and provided with a notch portion on an outer peripheral surface thereof;
balls configured to roll between the screw groove of the screw shaft and the screw groove of the nut; and
a circulation part forming a ball circulation path for circulating the balls rolling between both screw grooves of the screw shaft and the nut and attached to the notch portion,
wherein the nut is formed with, in the notch portion, an elongated hole that penetrates in a radial direction, and whose longitudinal direction is formed along a lead angle and parts of both longitudinal side surfaces parallel to each other guide the balls,
wherein the circulation part includes
a first circulation component that is disposed in the notch portion so as to abut against a bottom wall surface of the notch portion and has a tongue portion accommodated in the elongated hole,
a second circulation component that is disposed in the notch portion so as to cover the first circulation component and accommodated in the elongated hole, and has a wall portion facing the tongue portion, and
a pipe that is disposed in an abutting surface where the first circulation component and the second circulation component abut against each other, constitutes a part of the ball circulation path, and has a higher strength than materials of the first and second circulation components,
wherein the notch portion includes a first bottom wall surface and a second bottom wall surface, the first bottom wall surface being deeper into the notch than the second bottom wall surface,
wherein the elongated hole is at least partially formed in the second bottom wall surface,
wherein the first circulation component contacts the first bottom wall surface and the first circulation component has a tongue portion, and
wherein the second circulation component has an extending portion that contacts the second bottom wall surface.

2. The ball screw according to claim 1,
wherein a scoop-up part of the ball circulation path is constituted by the tongue portion of the first circulation component, the wall portion of the second circulation component, and the both longitudinal side surfaces of the elongated hole, and
wherein a direction changing part of the ball circulation path is constituted by the pipe.

* * * * *